United States Patent
Varkki et al.

(10) Patent No.: US 10,579,124 B2
(45) Date of Patent: *Mar. 3, 2020

(54) MOBILE PLATFORM AND A METHOD THEREIN

(71) Applicant: TELEFONAKTIEBOLAGET LM ERICSSON (PUBL), Stockholm (SE)

(72) Inventors: Olli Varkki, Oulu (FI); Harri Eksymä, Oulu (FI); Marko Pessa, Oulu (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

This patent is subject to a terminal disclaimer.

(21) Appl. No.: 15/902,017

(22) Filed: Feb. 22, 2018

(65) Prior Publication Data

US 2018/0210535 A1 Jul. 26, 2018

Related U.S. Application Data

(63) Continuation of application No. 14/895,651, filed as application No. PCT/EP2014/061545 on Jun. 4, 2014, now Pat. No. 9,939,877.

(30) Foreign Application Priority Data

Jun. 4, 2013 (EP) .................................. 13170348

(51) Int. Cl.
    *G06F 1/26* (2006.01)
    *G06F 1/32* (2019.01)
    (Continued)

(52) U.S. Cl.
    CPC .............. *G06F 1/3228* (2013.01); *G06F 1/26* (2013.01); *G06F 1/3203* (2013.01);
    (Continued)

(58) Field of Classification Search
    CPC ..................................... G06F 1/32; G06F 1/26
    See application file for complete search history.

(56) References Cited

U.S. PATENT DOCUMENTS 6,895,517 B2  5/2005 Wang
7,383,449 B2  6/2008 Nokkonen
              (Continued)

FOREIGN PATENT DOCUMENTS

KR  1020130030683 A  3/2013

OTHER PUBLICATIONS

Extended European Search Report issued in corresponding European application No. EP 13 17 0348, date of completion of the search Sep. 30, 2013.
(Continued)

*Primary Examiner* — Phil K Nguyen
(74) *Attorney, Agent, or Firm* — Patent Portfolio Builders PLLC

(57) ABSTRACT

A method for controlling powering of a mobile platform comprising a first Finite State Machine (FSM) and a second FSM. The method comprises synchronizing the first FSM with the second FSM, wherein the first FSM is arranged on a first Integrated Circuit (IC) comprised in the mobile platform and configured to control a first Power Management Unit (PMU) arranged on the first IC, and wherein the second FSM is arranged on a second IC comprised in the mobile platform and configured to control a second PMU arranged on the second IC, whereby the first PMU and the second PMU are synchronized to operate simultaneously during rank-up and rank-down, thereby providing power control of the mobile platform.

13 Claims, 6 Drawing Sheets

(51) Int. Cl.
*G06F 1/3228* (2019.01)
*G06F 1/3203* (2019.01)
*G06F 1/3287* (2019.01)
*G06F 9/52* (2006.01)

(52) U.S. Cl.
CPC .............. *G06F 1/3287* (2013.01); *G06F 9/52* (2013.01); *Y02D 10/171* (2018.01)

(56) References Cited

U.S. PATENT DOCUMENTS

| | | |
|---|---|---|
| 7,395,440 B2 | 7/2008 | Nokkonen |
| 8,245,061 B2 | 8/2012 | Rauschmayer et al. |
| 2004/0227404 A1 | 11/2004 | Boros et al. |
| 2005/0246556 A1 | 11/2005 | Oshins et al. |
| 2005/0246719 A1 | 11/2005 | Oshins et al. |
| 2006/0288246 A1 | 12/2006 | Huynh |
| 2007/0070673 A1 | 3/2007 | Borkar et al. |
| 2007/0208960 A1 | 9/2007 | Yamada et al. |
| 2008/0054866 A1 | 3/2008 | Korsunsky |
| 2008/0082839 A1 | 4/2008 | Dibene et al. |
| 2008/0162770 A1 | 7/2008 | Titiano et al. |
| 2009/0019262 A1* | 1/2009 | Tashiro ................ G06F 9/3016 712/208 |
| 2009/0054075 A1* | 2/2009 | Boejer .................. G01S 19/09 455/456.1 |
| 2010/0156361 A1 | 6/2010 | Barrenscheen |
| 2010/0332866 A1 | 12/2010 | Lee et al. |
| 2012/0205987 A1 | 8/2012 | Kung et al. |
| 2013/0073878 A1 | 3/2013 | Jayasimha et al. |
| 2016/0109922 A1* | 4/2016 | Chen ........................ G06F 1/10 713/322 |

OTHER PUBLICATIONS

Final Office Action, dated Sep. 26, 2017, in corresponding U.S. Appl. No. 14/895,651.
International Preliminary Report on Patentability issued in corresponding International application No. PCT/EP2014/061545, date of completion of the report Aug. 28, 2015.
International Search Report issued in corresponding International application No. PCT/EP2014/061545, date of completion of the International search Jul. 4, 2014.
Office Action, dated Apr. 5, 2017, in corresponding U.S. Appl. No. 14/895,651.

* cited by examiner

MOBILE PLATFORM AND A METHOD THEREIN

TECHNICAL FIELD

Embodiments herein relate to a mobile platform and to a method therein. In particular, embodiments herein relate to power control.

BACKGROUND

Modern mobile platforms have constantly increasing power demands. Platforms will require more power supplies, i.e. regulators, to supply different functions in the platform. Granularity in power supply usage is required to optimize efficiency, as load currents may be high. Thus supply voltage should preferably be optimised in order to avoid any efficiency loss. Eventually, more and more regulators are required to achieve good battery life time for future mobile electronic products. Often regulators are Switched Mode Power Supplies (SMPS) which achieves good efficiency. If all power supplies in a platform are concentrated to a single Integrated Circuit (IC), location of the SMPS on the Printed Circuit Board (PCB) might be non-optimum versus the load location. Further, thermal heating might become too excessive for one IC to sustain. Thus, a solution is to add more and more regulator ICs, i.e. more and more ICs that each comprises one or more regulators such as one or more SMPS, to the mobile platform. However, with many regulator ICs it becomes more complex to control all the regulators, especially taking into account that regulators are typically controlled and enabled during boot up sequence when platform Soft Ware (SW) is not yet in charge of the regulator control. Further, it is important that regulators are enabled and disabled in certain specific orders. Start-up order is important in order to guarantee platform functionality but also to avoid all SMPS to activate simultaneously with excessive momentary battery currents as a result.

Even if two similar regulator ICs would be enabled exactly at the same time point, they could enable their one or more regulators at different times because the time base in each regulator IC varies. The reason for that is typically that, due to cost reasons, low precision oscillators are used in the regulator ICs in order to take care of the time base. In a mobile platform this could lead to a misaligned rank sequence and cause malfunctioning of the mobile platform.

In case a plurality of ICs is present in the mobile platform, one of the ICs is normally defined to be a master circuit, while the other circuits are defined to be slave circuits. The master circuit controls the power-up and power-down of the entire system. This may be realized with an enable signal which is controlled by the master circuit and which can be detected by the slave circuits. Whenever the enable signal becomes active, the slave circuits cause the associated functional components to be powered up, and whenever the enable signal becomes inactive, the slave circuits cause the associated functional components to be powered down.

U.S. Pat. No. 7,395,440 B2 relates to an electronic device comprising at least two power management circuits and a signal line connecting the circuits. Each of the circuits is adapted to control a power supply to at least one functional component of the electronic device. Each of the circuits is adapted to detect a condition which requires powering down functional components of said electronic device and to set the signal line to a predetermined state, in case the circuit detects a condition which requires a powering down of the electronic device. Further, each of the circuits is adapted to monitor a state of the signal line and to power down all functional components associated to it upon detection of the predetermined state of the signal line.

US 2004/0227404 A1 discloses that power supplies, supplied with an input voltage to produce output voltages, are controlled in a desired sequence, and their output voltages are monitored, by respective state machines of two or more control units which are coupled in cascade by a bidirectional path on which commands and acknowledgements are coupled serially in frames.

A drawback with the prior art is that they don't provide simultaneous power control of a plurality of power units.

SUMMARY

An object of embodiments herein is to provide an improved method for controlling powering of a mobile platform. According to a first aspect the object is achieved by a method for controlling powering of a mobile platform comprising a first Finite State Machine and a second Finite State Machine. The method comprises synchronizing the first Finite State Machine with the second Finite State Machine, wherein the first Finite State Machine is arranged on a first Integrated Circuit comprised in the mobile platform and configured to control a first Power Management Unit arranged on the first Integrated Circuit, and wherein the second Finite State Machine is arranged on a second Integrated Circuit comprised in the mobile platform and configured to control a second Power Management Unit arranged on the second Integrated Circuit. Thereby the first Power Management Unit and the second Power Management Unit are synchronized to operate simultaneously during rank-up and rank-down, thereby providing power control of the mobile platform.

According to a second aspect the object is achieved by a mobile platform comprising a first Finite State Machine arranged on a first Integrated Circuit comprised in the mobile platform and configured to control a first Power Management Unit arranged on the first Integrated Circuit. The mobile platform further comprises a second Finite State Machine arranged on a second Integrated Circuit comprised in the mobile platform and configured to control a second Power Management Unit arranged on the second Integrated Circuit. A synchronization unit is comprised in the mobile platform and configured to synchronize the first Finite State Machine FSM with the second Finite State Machine FSM, whereby the first Power Management Unit and the second Power Management Unit are synchronized to operate simultaneously during rank-up and rank-down.

Further, by synchronizing the first and second FSMs arranged on different ICs, a robust start-up and start-down is provided for the mobile platform. Furthermore, battery currents are kept at a reasonable level.

BRIEF DESCRIPTION OF THE DRAWINGS

Examples of embodiments herein are described in more detail with reference to attached drawings in which.

DETAILED DESCRIPTION

Embodiments herein will be exemplified in the following detailed non-limiting description. The present application relates to Power Management Units (PMU) and Integrated Circuits (IC) comprised in a mobile platform.

The technical field of the present application further relates to a method to get more than one power management IC to power up and down in a controllable manner so that each regulator starts at the correct time slot. By this is meant that at least two regulators arranged at a respective Integrated Circuit start at the correct time slot. By the expression "starts at the correct time slot" is herein meant that the at least two regulators arranged at the respective Integrated Circuit start at the same rank step, cf. FIGS. 4a and 4b which will be described in more detail below.

As previously mentioned, a drawback with the prior art is that they don't provide simultaneous power control of a plurality of power units. A reason for this drawback is that the time base is not fixed in for example a cascade based system, wherein each control unit monitors a preceding voltage of a preceding regulator before activating the following regulator. In such prior art system, if parallel regulator tracks exist, the final regulators may eventually start up at different points in time. Further, regulator output components and load currents may impact the actual timing of the point in time of the startup.

Figure 1:
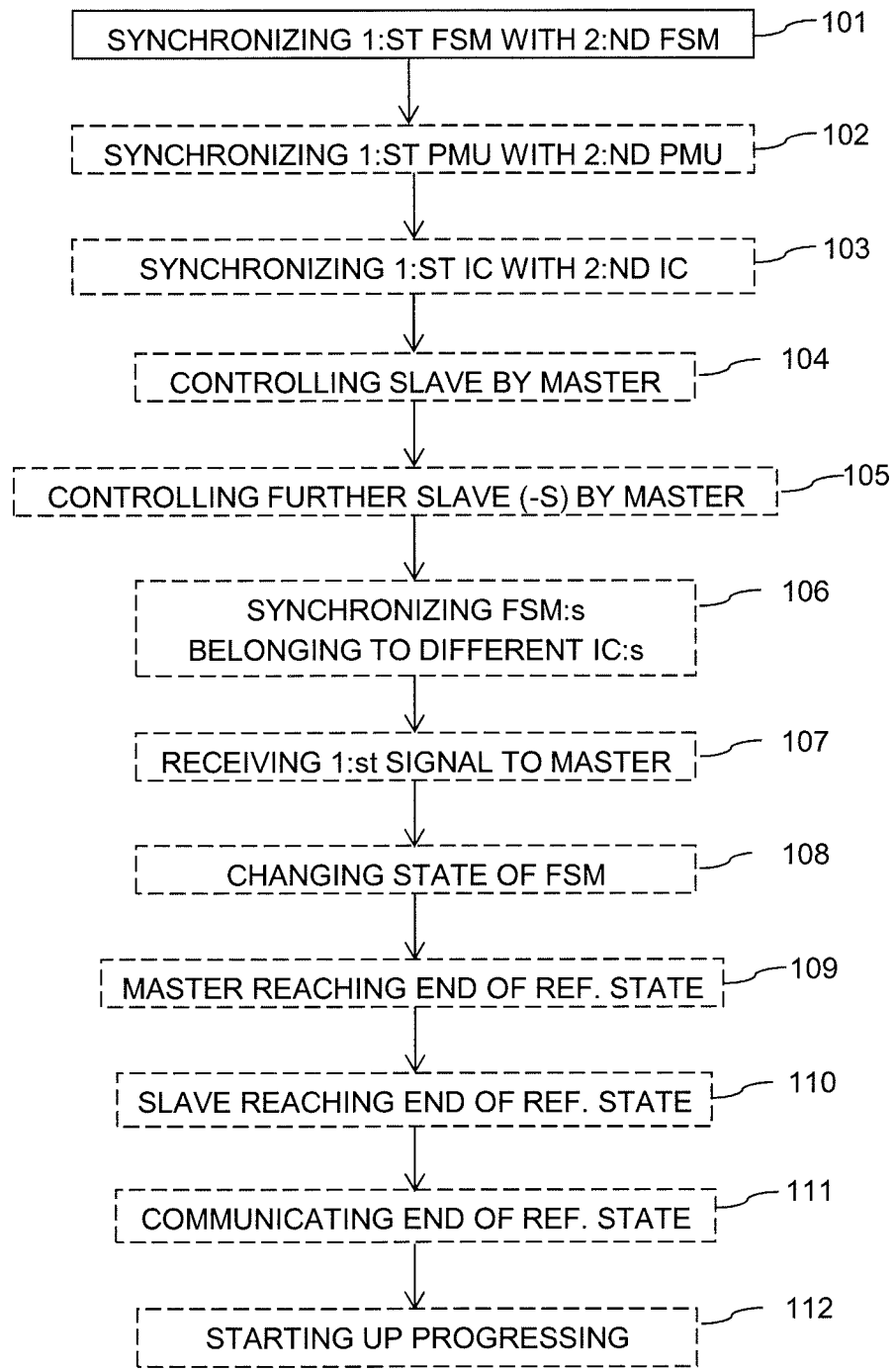
FIG. 1 shows a flow chart of an exemplified method.

Thus, methods disclosed herein relates to how to get more than one power management IC to power up and down in a controllable manner so that each regulator, starts at a correct time slot, no matter at which IC the regulator is located at. This is achieved by a method for controlling powering of a mobile platform as shown in FIG. 1. The mobile platform comprises at least a first Finite State Machine (FSM) and a second Finite State Machine (FSM).

Figure 5:
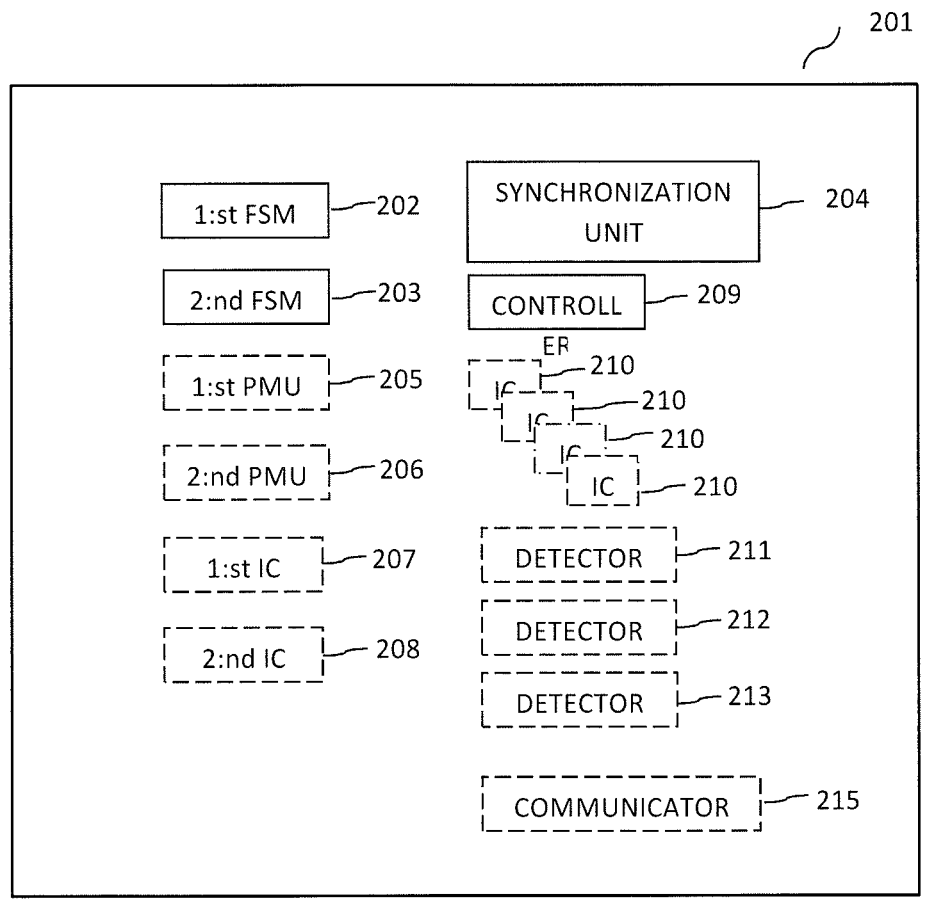
FIG. 5 shows an exemplified mobile platform.

Before describing the method in more detail, embodiments of a mobile platform 201, which is schematically illustrated in FIG. 5, will be briefly described. As schematically illustrated, embodiments of the mobile platform 201 comprises a first Finite State Machine (FSM) 202, and a second FSM 203. The first and second FSM 202, 203 may be comprised in a respective Integrated Circuit (IC) and may be so-called start-up FSMs configured to handle start up and shut down of the respective IC. An embodiment of the FSM 201,202 is given in FIG. 2, which will be described in more detail below.

The mobile platform 201 comprises also a first Power Management Unit (PMU) 205 and a second PMU 206. Herein, the PMU 205,206 may comprise one or more regulator. Further, in some embodiments, the PMU comprises one or more regulators and a FSM. The first FSM 202 and the first PMU 205 are arranged on a first Integrated Circuit (IC) 207 comprised in the mobile platform 201, and the second FSM 203 and the second PMU 206 are arranged on a second IC 208 comprised in the mobile platform 201. Further, the first and second FSM 202, 203 are configured to control the respective first and second PMU 205, 206.

The mobile platform 201 comprises further a synchronization unit 204 configured to synchronize the first FSM 202 with the second FSM 203.

The platform 201 may further comprise a controller 209 configured to control the second IC 208 acting as a slave circuit by means of the first IC 207 acting as a master circuit. Further, the mobile platform 201 may comprise one or more further Integrated Circuits IC 210 acting as one or more slave circuits. In some embodiments, the mobile platform 201 comprises a receiver 211 configured to receive a signal, such as an external signal. The mobile platform 201 may also comprise one or more detectors 212-214 adapted to detect change of state of the FSMs 202, 203 and the IC 207, 208. Further, the mobile platform 201 may comprise a communicator 215 adapted to provide communication between the ICs 207, 208.

The method for controlling powering of a mobile platform as shown in FIG. 1 will now be described in more detail. It should be understood that actions may be taken in another suitable order and that actions may be combined.

Action 101

The method comprises in a first action 101 synchronizing the first Finite State Machines FSM 202 with the second Finite State Machines FSM 203 comprised in the mobile platform 201. Thus, synchronization of the Finite State Machines (FSMs) 202, 203 at different ICs 207, 208 is performed. The selected start up time slot, and rank order, will remain constant and the desired one, and allows the platform 201 to start up in safe manner. By synchronizing the FSMs 202, 203, various different interfaces and means could be provided for the actual synchronization. Examples are described below in order to illustrate the idea of embodiments shown. The interface used for the synchronization is not the main point. In the example two similar power management ICs, or Power Management Units (PMU) 205, 206, are synchronized. The Master IC is the IC that controls the other IC called slave. The mobile platform 201 may thus comprise at least a first Power Management Unit PMU 205 and a second Power Management Unit PMU 206. As previously mentioned, the first and second PMU 205, 206 are arranged at a respective first and second IC 207, 208.

In some embodiments, the synchronization is performed by the synchronization unit 204 comprised in the mobile platform 201.

Action 102

The method may comprise in action 102 synchronization of the first Power Management Unit PMU 205 with the second Power Management Unit PMU 206. Thereby a selected start up time will remain constant. By the expression "a selected start up time will remain constant" when used herein is meant that the selected start up time is predefined and that the start-up will occur at the same point in time for both PMUs. Further, by the synchronization, a selected start-up sequence, i.e. rank order, will be synchronized for both PMUs.

Figure 2:
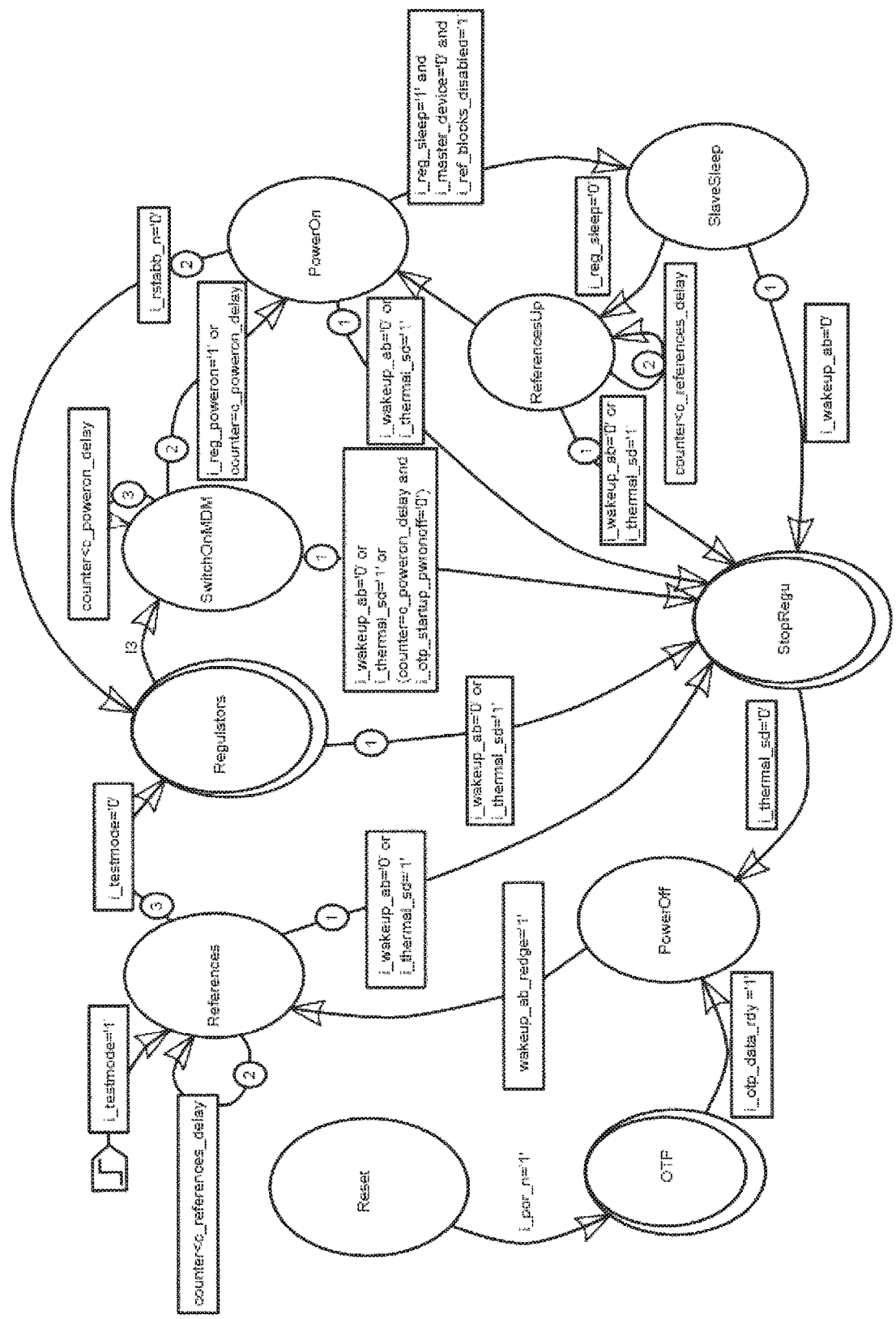
FIG. 2 shows the Finite State Machine (FSM) of the Power Management Units (PMUs).

FIG. 2 shows the FSM 202, 203 of the PMUs 205, 206, which are identical. FIG. 2 will be explained in more detail below, however, as is seen in FIG. 2, the FSM 202, 203 has many states such as "Reset", "OTP (One Time Programmable memory)", "PowerOff", "References", "Regulators", "StopRegu", "SwitchOnMDM", "PowerOn", "ReferencesUp", and "SlaveSleep" schematically illustrated with oval shapes. The main states for regulator rank-up and rank-down, i.e. the start and stop procedures, are the "Regulators"-state and "StopRegu"-state. The synchronization ensures that the rank-up-state starts simultaneously in both PMUs 205, 206, i.e. the "Regulators"-state is initiated at the same point in time in both the first and the second PMUs 205, 206. Similarly, all states that somehow control the regulators should start simultaneously. Examples of such states are the Regulators-state and the StopRegu-state which are controlling the rank-up and the rank-down.

The selected start up time may be predefined by means of the OTP memory. Thus, each IC may have its own OTP memory that is programmed to define when one or more regulators of the IC's PMU should start up. That is, for each regulator a start-up rank number is defined. Thus, as will be described with reference to FIGS. 4a and 4b, regulators arranged at different IC's having the same start-up rank number will start up at the same point in time.

Figure 3:
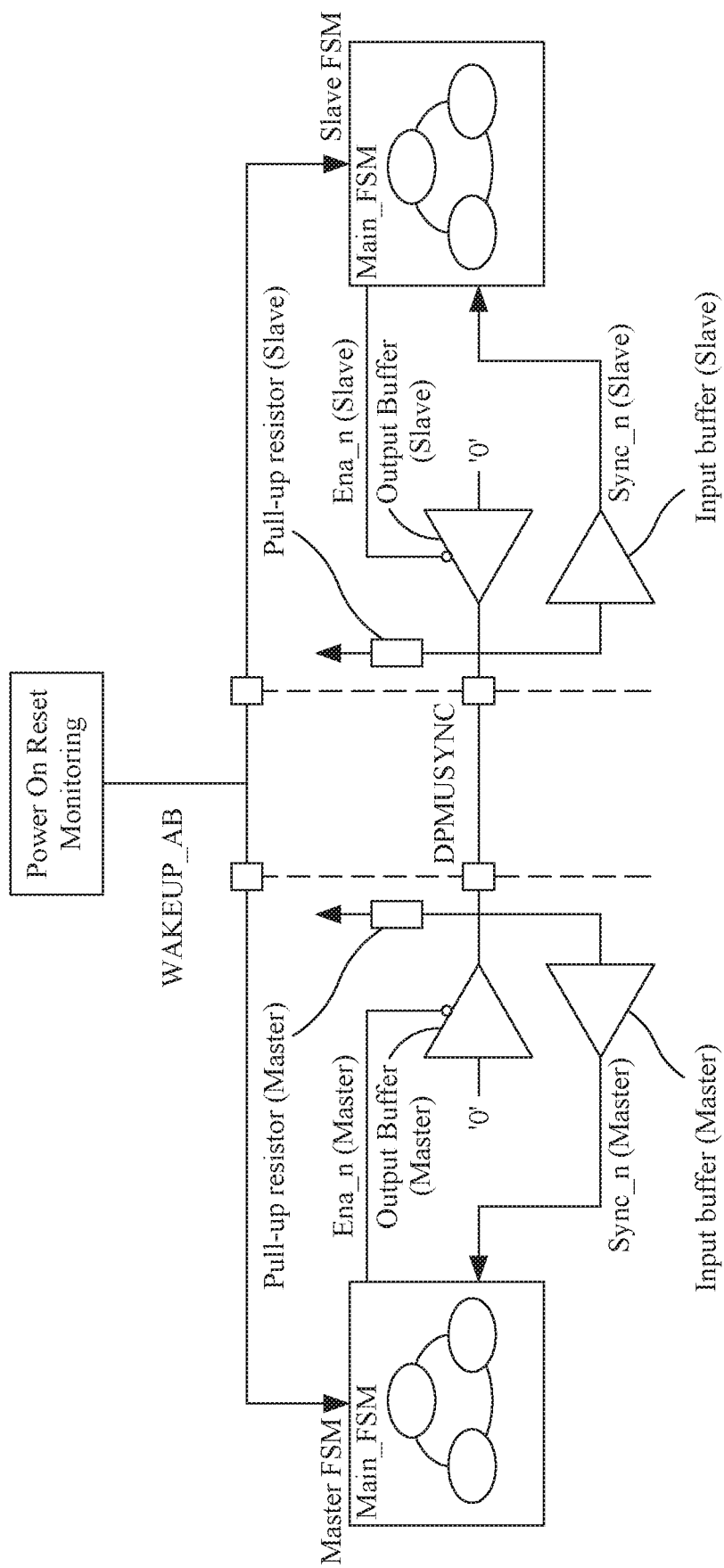
FIG. 3 shows means used for synchronization in embodiments disclosed herein.

FIG. 3 schematically shows the means used for the synchronization. FIG. 3 will be explained in more detail below. The means for synchronization may be comprised in the synchronization unit 204. Both PMUs 205,206 has a ball called DPMUSYNC used for a two way communication between the master circuit 207 and the slave circuit 208, providing information of the various phases of the respective FSM 202, 203. By the term "ball" when used herein is meant a physical connector of the IC, such as an Input/output (IO) device, which may be soldered to the printed circuit board.

In some embodiments, the synchronization is performed by the synchronization unit 204 comprised in the mobile platform 201.

Action 103

In other exemplified embodiments herein, the mobile platform 201 may comprise at least a first Integrated Circuit IC 207 and a second Integrated Circuit IC 208. The method may then comprise, in a further action 103, synchronizing the first Integrated Circuit IC 207 with the second Integrated Circuit IC 208. The first Integrated Circuit IC 207 may act as a master circuit, and the second Integrated Circuits IC 208 may act as a slave circuit.

In some embodiments, the synchronization is performed by the synchronization unit 204 comprised in the mobile platform 201.

Action 104

The method may further comprise, in action 104, controlling the slave circuit 208 by means of the master circuit 207. The mobile platform 201 may further comprise one or more further Integrated Circuits IC 210 acting as a slave circuit.

In some embodiments, the control is performed by the controller 209 comprised in the mobile platform 201.

Action 105

Then, the exemplified method may further comprise, in action 105, controlling the further one or more Integrated Circuits IC 210 acting as slave circuits by means of the Integrated Circuit IC 207 acting as master circuit.

In some embodiments, the control is performed by the controller 209 comprised in the mobile platform 201.

Action 106

The method may further comprise, in action 106, synchronizing at least two Finite State Machines FSMs 202, 203 comprised in the mobile platform 201, and which at least two Finite State Machines FSMs 202, 203 belong to different Integrated Circuits ICs 207, 208. The synchronization may be performed by exchanging information associated with the master Integrated Circuit IC 207 and information associated with the at least one slave Integrated Circuit IC 208, 210. For example, the slave circuit 208,210 may inform the master circuit 207 that it has reached the end of the References-state, and the master circuit 207 may inform the slave circuit 208,210 about a rank start position, e.g. a new rank start position, for each rank slot.

In some embodiments, the synchronization is performed by the synchronization unit 204 comprised in the mobile platform 201.

Actions 107-112

Figure 4A:
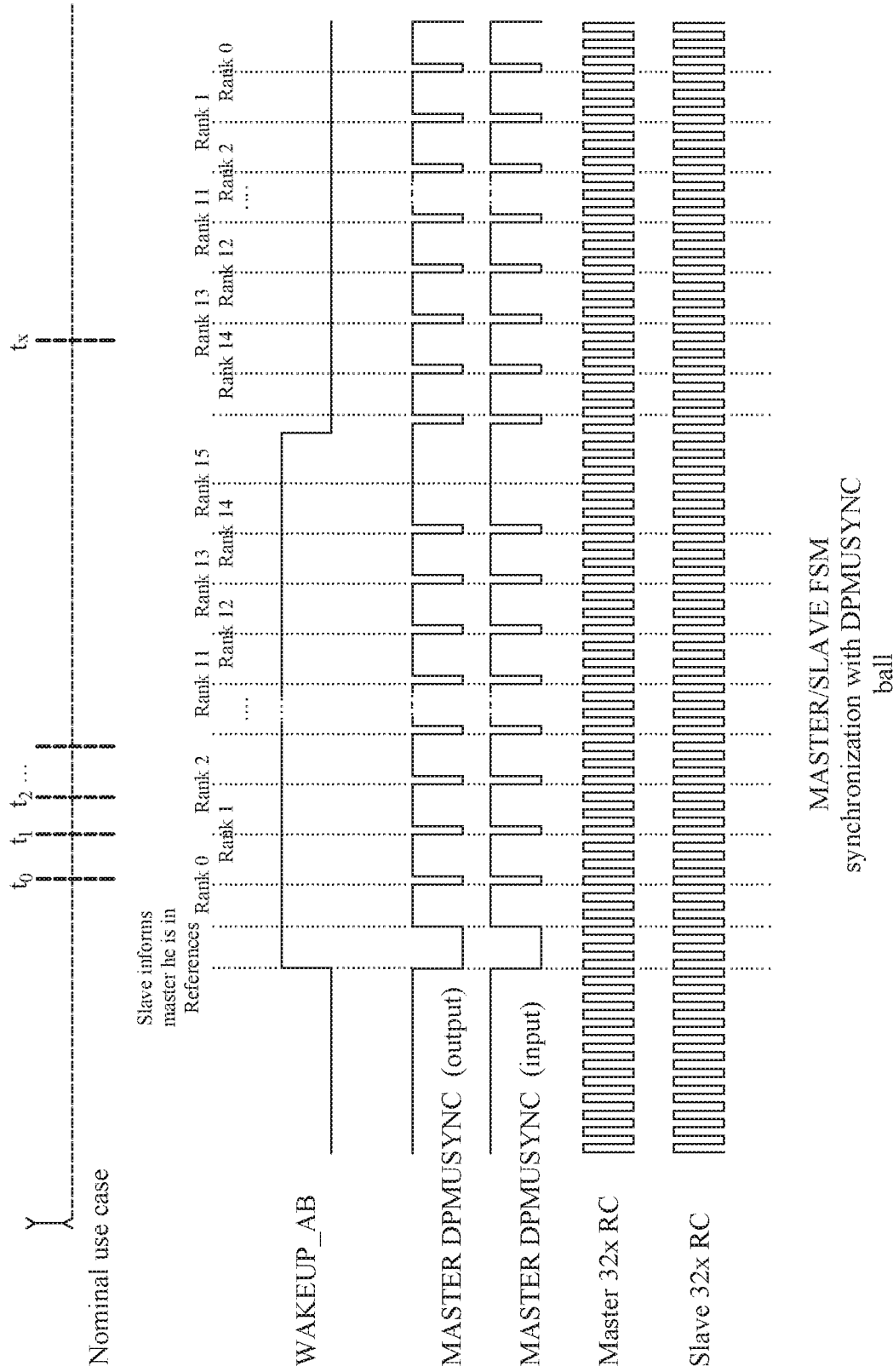
FIG. 4a shows a nominal use case in accordance with embodiments disclosed herein.
Figure 4B:
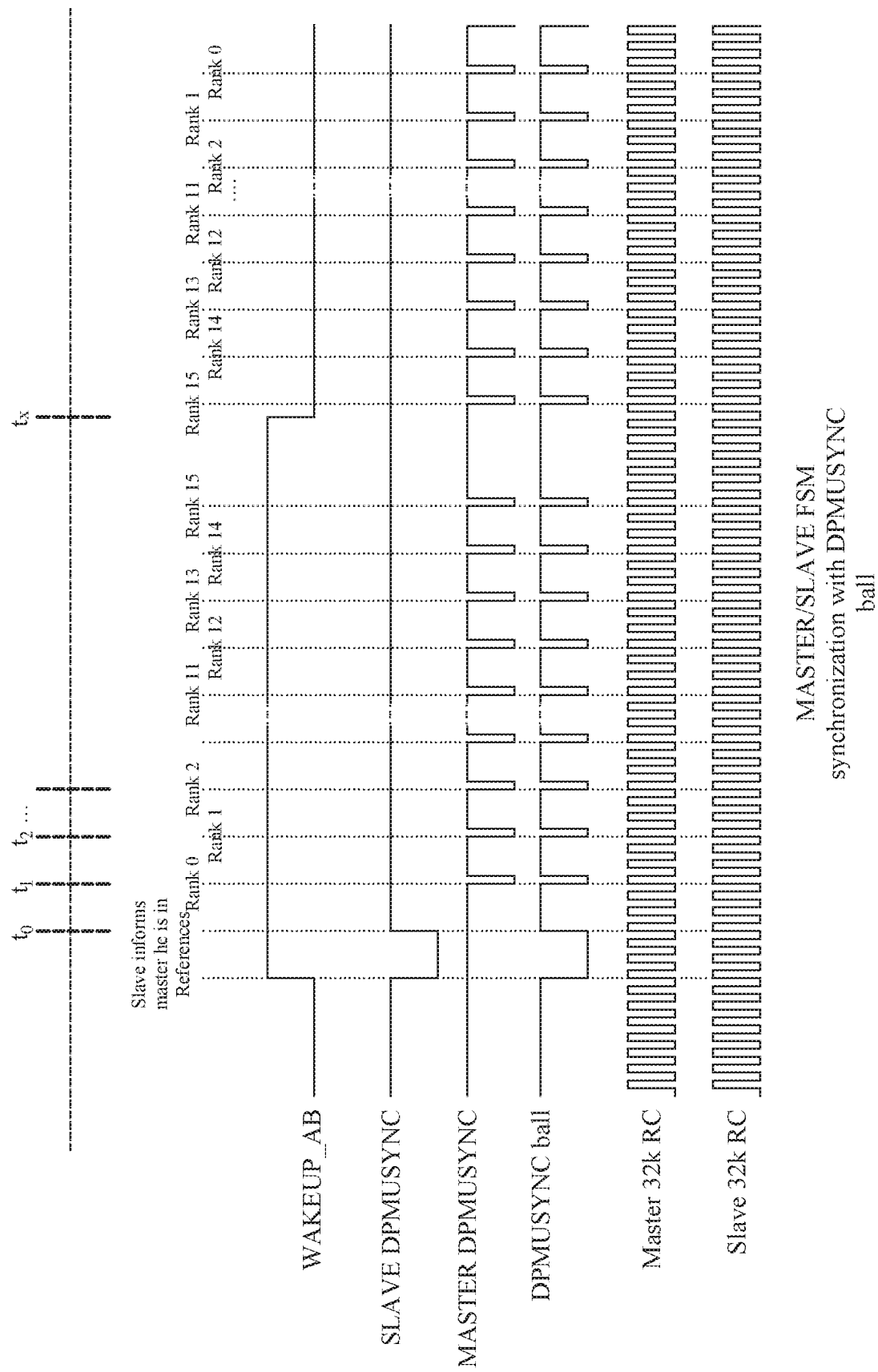
FIG. 4b shows a nominal use case in accordance with embodiments disclosed herein.

FIGS. 4a and 4b show embodiments of a nominal use case. Reference will be made to FIGS. 4a and 4b when describing Actions 107-112, however FIGS. 4a and 4b will be described in more detail below. The method may further comprise, in action 107, receiving a first signal to any Integrated Circuit IC 207 acting as master. The first signal may be an external signal received by the mobile platform 201. Further, the first signal is to be used in any IC 207 acting as a master circuit in order to control the one or more ICs 208, 210 acting as slave circuits. Furthermore, the first signal may be received in the first integrated circuit 207 and in the second integrated circuit 208. Yet further, the first signal may be received in the one or more further integrated circuits 210 acting as slave circuits. In some embodiments, the signal is received by the receiver 211 comprised in the mobile platform 201.

With reference to FIG. 2, as schematically illustrated, the i_por_n signal is generated internally in each IC when a battery is in place. The signal wakeup_ab_redge is an interpretation of the external signal going to all ICs, which external signal corresponds to the first signal mentioned above, and which signal sometimes is called WAKEUP_AB, cf. also FIGS. 3, 4a and 4b. When the two conditions are satisfied for all ICs, that is when the battery is in place, e.g. when the "i_por_n=1", and when the WAKEUP_AB is received, e.g. when "wakeup_ab_redge=1", the respective FSMs move to the References-state.

It should be understood that the WAKEUP_AB signal may be generated by means of an external button of the mobile platform, which button a user may press in order to activate the mobile platform, or it may be generated from another IC controlling the platform.

In action 108, the state of the Finite State Machine FSM is changed from "PowerOff" towards "PowerOn". Both PMUs 205, 206 receive the WAKEUP_AB-signal which makes the respective FSM 202,203 to progress from the "PowerOff"-state towards the "PowerOn"-state, cf. FIG. 2. As previously mentioned, the WAKEUP_AB-signal corresponds to the first signal mentioned above. Now, the master IC 207 waits at the end of the "References"-state so that also the slave IC 208, 210 will reach the end of the "References"-state. The "References"-state is a state wherein one or more preset values to be used in the rank-up are set. The one or more preset value may be start up time slot, start up time, rank order, shutdown time slot, shutdown time, output voltage, etc. Further, in the References-state, reference voltages, reference currents, and clocks may be started, so that regulators may be enabled. In the OTP-state, which state precedes the References-state, one or more start-up time slots, shutdown time slots and default output voltages may be downloaded. The OTP-state may also define other things such as regulator operating modes, clock frequencies, etc.

In action 109, the end of the "References"-state is reached by the Integrated Circuit IC 207 acting as master and, in action 110, the end of the "References"-state is reached by any Integrated Circuit IC 208, 210 acting as slave.

In action 111, reach of the end of the "References"-state by any Integrated Circuit IC 208, 210 acting as slave is communicated to the Integrated Circuit IC 207 acting as master. Thus, the Slave IC 208, 210 communicates that the end of the "References"-state is reached by pulling the DPMUSYNC signal low for a short period. This may be performed by the communicator 215 comprised in the mobile platform 201.

In action 112, starting up progressing with rank-up is performed by the Integrated Circuit 207 acting as master. Thus, after the slave IC 208, 210 has acknowledged it has reached the "References"-state, the master IC 207 starts progressing with rank-up. As illustrated in FIGS. 4a and 4b, the example comprises a rank-up process with 16 rank steps denoted Rank 0, Rank 1, . . . , Rank 15, and a rank-down process comprising the 16 rank steps processed in reversed order, i.e. Rank 15, Rank 14, . . . , Rank 0. The master IC 207 provides information about each rank step, 16 rank steps in this example, by providing a low state pulse at the DPMUSYNC-signal. In this way, the slave IC 208, 210 receives information of the rank state and may enable it's regulators at specific ranks, and the ranks stay aligned. For example, the rank step Rank 14 will take place at the very same point in time in all ICs 207,208,210 comprised in the mobile platform 201. That means that all regulators that are 'selected' to start in Rank 14 will start at the same time no matter in which IC 207,208,210 the respective regulator is located.

As mentioned in the background section, due to cost reasons, low precision oscillators are used in the regulators. Further, the total rank sequence, e.g. the Rank 0 to Rank 15 in FIGS. 4a and 4b, is so long in time that if both PMUs 205, 206 would rely on their inaccurate oscillators the final rank states could happen at very different time points between master and slave. In other words, if the PMUs 205, 206 are relying on their respective oscillator, they would reach their respective final rank state at different points in time. Thus, the regulators of the PMUs 205,206 could start at wrong order. However, by embodiments described herein it is possible to align rank-up and rank-down of the regulators located at different ICs 207, 208 to accomplish a robust platform start-up and start-down. Also battery currents are kept at reasonable level when the regulators are enabled in good sequence. Further, by embodiments herein, it is possible to distribute the regulators at optimum locations at the mobile platform Printed Circuit Board (PCB) to better serve load and still keep the good control over the rank sequences, while SW is not yet in charge of the regulator control.

To perform the methods steps for controlling powering of a mobile platform, embodiments of the mobile platform 201 comprises an arrangement depicted in FIG. 5, previously described. Thus, the mobile platform 201 comprises a first Finite State Machine FSM 202, a second Finite State Machine FSM 203, and a synchronization unit 204 configured to synchronize the first Finite State Machines FSM 202 with the second Finite State Machines FSM 203. The mobile platform 201 may further comprise at least a first Power Management Unit PMU 205 and a second Power Management Unit PMU 206. The synchronization unit 204 may be configured to synchronize the first Power Management Unit PMU 205 with the second Power Management Unit PMU 206, whereby a selected start up time will remain constant. The mobile platform 201 may further comprise at least a first Integrated Circuit IC 207 and a second Integrated Circuit IC 208. The synchronization unit 204 is configured to synchronize the first Integrated Circuit IC 207 with the second Integrated Circuit IC 208. The first Integrated Circuit IC 207 may act as a master circuit, and the second Integrated Circuit IC 208 may act as a slave circuit. The platform 201 may further comprise a controller 209 configured to control the slave circuit 208 by means of the master circuit 207.

In some embodiments, the mobile platform 201 may further comprise one or more further Integrated Circuits IC 210 acting as a slave circuit. The controller 209 is configured to control the further one or more Integrated Circuits IC 210 acting as slave circuits by means of the first Integrated Circuit IC 207 acting as master circuit. The synchronization unit 204 may be configured to synchronize at least two Finite State Machines FSMs 202, 203 comprised in the mobile platform 201 and belonging to different Integrated Circuits ICs 207, 208 by means of exchanging information between a master Integrated Circuit IC 207 and at least one slave Integrated Circuit IC 208.

In still other embodiments, the platform 201 may further comprise a receiver 211 adapted to receive a first signal in the Integrated Circuit IC 207 acting as master. However, it should be understood that also the slave circuit 208, 210 may receive the first signal. In some embodiments, each integrated circuit 207,208,210 monitors the WAKEUP_AB signal to determine when it is going high.

The FSM 202,203 may comprise the receiver 211. In some embodiments, the receiver 211 is an inbuilt part of each FSM 202,203.

Further, the mobile platform 201 may comprise a detector 212 adapted to detect a change of state of the Finite State Machine FSM 202, 203 from a "PowerOff"-state towards a "PowerOn" state. Furthermore, the mobile platform 201 may comprise a detector 213 adapted to detect reach of the end of the "References"-state by the Integrated Circuit IC 207 acting as master, and a detector 214 adapted to detect reach of the end of the "References"-state by the Integrated Circuit IC 208 acting as slave. However, it should be understood that the FSM 202,203 may know when it has finished the References-state without using a detector since the references-state may last a fixed number of clock cycles.

In some embodiments, the mobile platform 201 comprises further a communicator 215 adapted to communicate reach of the end of the "References"-state by the Integrated Circuit IC 208, 210 acting as slave to the Integrated Circuit IC 207 acting as master. As previously mentioned, the reach of the end of the "References"-state starts up the Integrated Circuit acting as master to progress with rank-up.

An exemplifying embodiment of a Finite State Machine of an exemplifying embodiment of a Power Management Unit will now be described in more detail will reference to FIG. 2. As previously mentioned, the FSM 202, 203 has many states such as "Reset", "OTP", "PowerOff", "References", "Regulators", "StopRegu", "SwitchOnMDM", "PowerOn", "ReferencesUp", and "SlaveSleep" schematically illustrated with oval shapes in FIG. 2. In some embodiments herein, one or more reference voltage generators and one or more clock generators are started-up in the References-state. Further, in the Regulators-state the actual start-up for each regulator is implemented in pre-defined rank slots. That is, the actual start-up for each regulator is implemented in one of the rank states Rank 0 to Rank 15. Furthermore, in the StopRegu-state shutdown of regulators is done in pre-defined rank slots. That is, shutdown is accomplished according to one or more of the rank states Rank 15 to Rank 0.

An exemplifying embodiment of means for synchronization will now be described in more detail will reference to FIG. 3. FIG. 3 shows one implementation example of the communication channel in order to implement the synchronization. Bidirectional open-drain IO with pullups is used to drive DPMUSYNC signal. As schematically illustrated in FIG. 3, the synchronization means may comprise a respective master and slave pull-up resistor configured to pull the line up in order to supply power. The synchronization means may further comprise a respective master and slave output buffer configured to pull the line down. The output buffer is sometimes referred to as a driver. If the output buffer is not pulling the line down, the respective resistor will pull the line up in order to supply power. The synchronization means may further comprise a respective master and slave input buffer that is used to 'monitor' the line state. That is, the input buffer monitors whether the line state is logic high or logic low. The master output buffer may be configured to communicate start of rank slots which may be detected by the slave input buffer.

If more than one slave circuit exist, the end of the references state may be communicated by the slave circuits by stopping to pull the line down. Thus, initially all slave circuits may pull the line down and when they reach end of the references state they may stop pulling the line down. When none of the slave circuits pull the line down, the line may be pulled up by the respective slave pull-up resistor and then the master circuit will know that all slave circuits are ready to start progressing with rank-up.

As previously mentioned, both the master circuit and the slave circuit monitor the WAKEUP_AB signal. Thus, when the WAKEUP_AB signal is high, the master FSM and the slave FSM should progress towards the Reference-state. By means of the DPMUSYNC signal the master circuit may control the slave circuit and thereby synchronizing the start-up and shut-down processes. This will be described in more detail below with reference to FIGS. 4a and 4b.

The exemplifying nominal use case illustrated in FIG. 4a will now be described in more detail. As illustrated, at $t_0$ when the WAKEUP_AB signal is set high, both the master circuit and the slave circuit start to progress towards the Reference-state. At $t_1$, the slave circuit communicates end of the Reference-state to the master circuit by stopping pulling the DPMUSYNC signal down, whereby the slave pull-up resistor may pull up the line causing the DPMUSYNC signal to be high, cf. also FIG. 4b. Thereafter, at $t_2$, the master circuit will pull the DPMUSYNC signal down for a short period of time in order to inform the slave circuit that rank state Rank 0 is started. This will be repeated each time the master circuit will inform the slave circuit about a new rank state, i.e. for each of the following rank states Rank 1-Rank 15. Thus, the master circuit will pull the DPMUSYNC signal down each time a new rank state is started. Thereby, the start-up procedure will be synchronized.

When the WAKEUP_AB signal is set low, e.g. at $t_x$, the master circuit will use the DPMUSYNC signal to synchronize the shutdown procedure in a manner corresponding to the start-up procedure. In other words, the master circuit will use the DPMUSYNC signal to inform the slave circuit of the start of each of the rank states Rank 15 to Rank 0.

In FIG. 4b, the signal SLAVE DPMUSYNC schematically illustrates how the slave circuit drives the line. As illustrated and previously described, the slave circuit pulls the line down for the duration of the References state. At t1 when the end of the References state is reached the slave circuit stops pulling the signal SLAVE DPMUSYNC down and the signal rises high. Further, the signal MASTER DPMUSYNC schematically illustrates how the master circuit pulls the line down at the beginning of each rank state. As previously described, by pulling down the DPMUSYNC signal down each time a new rank state is started, the master circuit informs the slave circuit(-s) about the start of the new rank state, whereby the start-up procedure or shut-down procedure will be synchronized. The signal DPMUSYNC ball schematically illustrates the sum or superposition of the SLAVE DPMUSYNC and MASTER DPMUSYNC signals.

Figure 6:
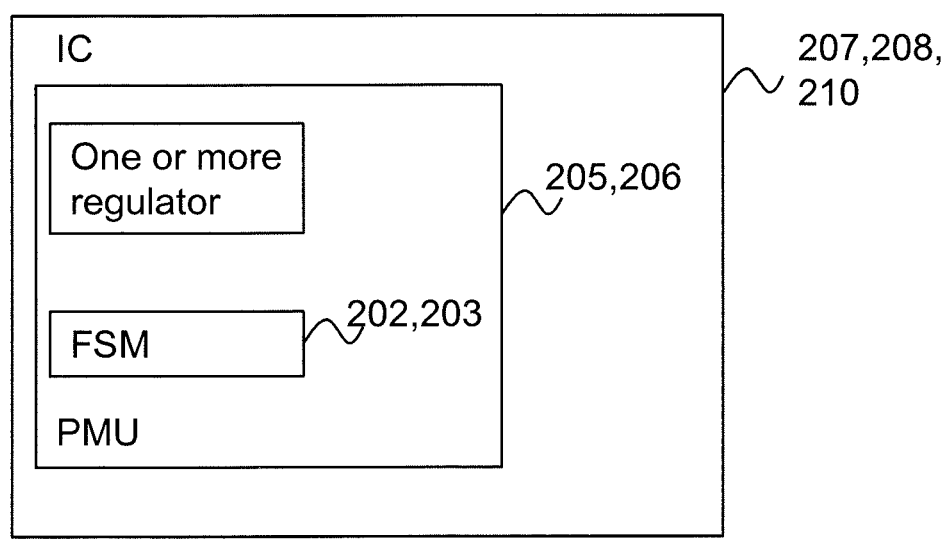
FIG. 6 shows an exemplified Integrated Circuit (IC).

FIG. 6 schematically illustrates an embodiment of the Integrated Circuit 207,208,210. As schematically illustrated, each IC 207,208,210 may comprise a PMU 205,206 comprising one or more regulator, and a FSM 202,203.

When using the word "comprise" or "comprising" it shall be interpreted as non-limiting, in the meaning of consist at least of. When using the word action/actions it shall be interpreted broadly and not to imply that the actions have to be carried out in the order mentioned. Instead, the actions may be carried out in any suitable order other than the order mentioned. Further, some action/actions may be optional. The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method for powering up a mobile platform comprising a first Finite State Machine, and a second Finite State Machine, wherein the first Finite State Machine is arranged on a first Integrated Circuit comprised in the mobile platform and configured to control a first Power Management Unit arranged on the first Integrated Circuit, and wherein the second Finite State Machine is arranged on a second Integrated Circuit comprised in the mobile platform and configured to control a second Power Management Unit arranged on the second Integrated Circuit, wherein the Power Management Units have a physical connector used for communication between the Power Management Units, wherein the mobile platform further comprises a first regulator arranged on the first Integrated Circuit and a second regulator arranged on the second Integrated Circuit, wherein the method comprises:

synchronizing the first Finite State Machine arranged on the first Integrated Circuit with the second Finite State Machine arranged on the second Integrated Circuit to align rank-up of the first and second regulators, the synchronizing comprising;

receiving a first signal in the first Integrated Circuit and in the second Integrated Circuit, changing states of each of the first and second Finite State Machines from a "PowerOff"-state to a "PowerOn"-state, reaching the end of a first "References"-state by the first Integrated Circuit, wherein the first "References" state is a state in which one or more reference voltages for the first Integrated Circuit are set, reaching the end of a second "References" state by the second Integrated Circuit wherein the second "References" state is a state in which one or more reference voltages for the second Integrated Circuit are set, communicating the end of the second "References" state by the second Integrated Circuit to the first Integrated Circuit; and starting up a combined rank-up procedure for the first and second Integrated Circuits.

2. The method according to claim 1, wherein the first Integrated Circuit is acting as a master circuit, and wherein the second Integrated Circuit is acting as a slave circuit, the method further comprises:

controlling the slave circuit by means of the master circuit.

3. The method according to claim 2, wherein the mobile platform comprises one or more further Integrated Circuits acting as a respective slave circuit, the method further comprises:

controlling the further one or more Integrated Circuits acting as respective slave circuits by means of the first Integrated Circuit acting as master circuit.

4. The method according to claim 1, wherein the synchronizing further comprises:
synchronizing the first Finite State Machine with the second Finite State Machine by exchanging information associated with the first Integrated Circuit and information associated with the second Integrated Circuit.

5. The method according to claim 1, wherein the mobile platform includes a first regulator and a first oscillator arranged on the first Integrated Circuit and a second regulator and a second oscillator arranged on the second Integrated Circuit.

6. The method according to claim 1, wherein at least two operations on the first and second Integrated Circuits having of a same rank each occur at respective same times on the first and second Integrated Circuits.

7. A mobile platform comprising:
a first Finite State Machine FSM arranged on a first Integrated Circuit comprised in the mobile platform and configured to control a first Power Management Unit arranged on the first Integrated Circuit,
a first regulator arranged on the first Integrated Circuit,
a second Finite State Machine FSM arranged on a second Integrated Circuit comprised in the mobile platform and configured to control a second Power Management Unit arranged on the second Integrated Circuit, wherein the Power Management units have a physical connector used for communication between the Power Management Units,
a second regulator arranged on the second Integrated Circuit,
and wherein the mobile platform is configured to carry out the method of claim 1.

8. The mobile platform according to claim 7, wherein the first Integrated Circuit IC is acting as a master circuit, and wherein the second Integrated Circuit IC is acting as a slave circuit, and wherein the mobile platform further comprises a controller configured to control the slave circuit by the master circuit.

9. The mobile platform according to claim 8, further comprising one or more further Integrated Circuits IC acting as a slave circuit, wherein the controller is configured to control the further one or more Integrated Circuits IC acting as slave circuits by the Integrated Circuit IC acting as master circuit.

10. The mobile platform according to claim 7, wherein the synchronizing further comprises:
synchronizing the first Finite State Machine with the second Finite State Machine by exchanging information associated with the first Integrated Circuit and information associated with the second Integrated Circuit.

11. The mobile platform according to claim 7, wherein the mobile platform includes a first regulator and a first oscillator arranged on the first Integrated Circuit and a second regulator and a second oscillator arranged on the second Integrated Circuit.

12. The mobile platform according to claim 7, wherein at least two operations on the first and second Integrated Circuits having a same rank each occur at respective same times on the first and second Integrated Circuits.

13. A user equipment comprising the mobile platform of claim 7.

* * * * *

UNITED STATES PATENT AND TRADEMARK OFFICE
CERTIFICATE OF CORRECTION

Page 1 of 2

PATENT NO. : 10,579,124 B2
APPLICATION NO. : 15/902017
DATED : March 3, 2020
INVENTOR(S) : Varkki et al.

It is certified that error appears in the above-identified patent and that said Letters Patent is hereby corrected as shown below:

In the Drawings

In Fig. 5, Sheet 6 of 6, delete " 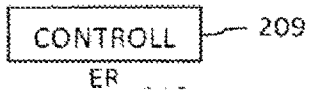 " and insert
--  --, therefor.

In Fig. 5, Sheet 6 of 6, in Line 10-13, delete " " and insert

-- --, therefor.

In the Specification

In Column 1, Line 33, delete "Soft Ware (SW)" and insert -- Software (SW) --, therefor.

In Column 3, Lines 49-50, delete "FSM 201,202" and insert -- FSM 202,203 --, therefor.

In Column 5, Line 7, delete "IC's" and insert -- ICs --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,579,124 B2

In Column 5, Line 18, delete "(IO)" and insert -- (I/O) --, therefor.

In Column 7, Line 38, delete "the methods steps for" and insert -- the steps of the methods for --, therefor.

In Column 8, Line 37, delete "will" and insert -- with --, therefor.

In Column 8, Line 54, delete "will" and insert -- with --, therefor.

In the Claims

In Column 10, Line 35, in Claim 1, delete "comprising;" and insert -- comprising, --, therefor.

In Column 11, Lines 14-15, in Claim 6, delete "having of a" and insert -- having a --, therefor.